UNITED STATES PATENT OFFICE.

JUSTIN F. WAIT, OF BUFFALO, NEW YORK.

PROCESS OF TREATING FILTRATION MEMBRANES.

1,350,532. Specification of Letters Patent. Patented Aug. 24, 1920.

No Drawing. Application filed January 3, 1920. Serial No. 349,335.

*To all whom it may concern:*

Be it known that I, JUSTIN F. WAIT, a citizen of the United States, residing at Buffalo, in the county of Erie and State of New York, have invented certain new and useful Improvements in Processes of Treating Filtration Membranes, of which the following is a specification.

This invention relates to a process of treating filtration membranes capable of filtering solutions or suspensions of colloidal matter.

It is now believed that colloidal action is at least analogous to capillary action, as distinguished from the previously-held theory that it is intra-molecular. In the following specification I shall assume the capillary theory, but without making the same a limitation.

It is well known that a capillary body, such for example, as a membrane for filtration of colloids, containing a given fluid, cannot be used for filtration of another fluid nonmiscible with said first-mentioned fluid. Such fluid therein contained must first be removed from the capillaries. For example, a membrane containing water cannot be made to filter a petroleum or coaltar derivative without first removing the water from the capillaries. As a more specific example, I have discovered that the only possible way to pass from ordinary membrane conditions to a condition for the filtration of coaltar products, such as benzol, toluol, xylol, and their homologues or derivatives, or other homologues or derivatives of coaltar or analogues, is to employ an alcohol or ketone, or a homologue or derivative of one or the other as a medium to effect the change.

In this specification I shall use the term "fluid" as indicating a substance to be treated, and the term "medium" as indicating a substance or substances which effect a change such that a membrane may be adapted from one fluid to another, and by "membrane" I mean any sort of a membrane of natural or artificial origin (and may be made of metal) capable of filtering solutions or suspensions of colloidal or analogous matter.

My invention relates broadly to methods of preparing such a membrane for filtration purposes and for changing over such a membrane for use with one fluid to use with another nonmiscible fluid.

I will first describe my process in the preparation of a membrane, such as a collodion membrane. I form the membrane in the usual way, and when it has solidified sufficiently and before any deterioration due to drying has intervened, I subject the same to a medium which is miscible with water and with the fluid to be filtered. This I do by soaking the membrane in such medium or by forcing such medium through the membrane by pressure. For example, if any coaltar or petroleum derivative or a homologue of either is to be filtered, I use an alcohol or ketone, or a derivative or homologue of either. Such medium will mix with the water in the capillaries, and by proper treatment, such as soaking or forcing-through, will displace and take the place of the water; and thus conditioned the membrane will filter the desired fluid. More specifically to illustrate this method, when the membrane is to be used with a coaltar or petroleum derivative, or any fluid nonmiscible with water, the membrane, as soon as dried and before deterioration takes place is subjected to alcohol of about ninety-five per cent. strength until the alcohol has supplanted the water in the membrane. When the membrane is then subjected to filtration conditions with a coaltar or petroleum derivative, admixture of the fluid and medium follows and the fluid takes the place of the medium in the membrane.

Again, suppose the fluid to be filtered is gasolene: I first treat the membrane with alcohol in the manner described, after which it is subjected to like treatment with benzol, when it will operate with gasolene. In such case it will be seen that I use two mediums, for the reason that the first fluid mixes more readily with water than the second, and the second more readily with gasolene than the first. To state this more broadly, if the substance to be filtered is a derivative of petroleum or other organic liquid miscible with a coaltar product, or its derivative or homologue, the membrane is brought into contact with an alcohol or a ketone, or a derivative or homologue of either, after which it is brought into contact with a liquid coaltar product, or a derivative or homologue of a coaltar product, and then the membrane is brought into contact with the petroleum product.

Such treatment is applicable substantially equally to other membranes. For example, a metallic membrane for filtering colloids may have absorbed sufficient moisture to render its use with a nonmiscible fluid inexpedient, and the water may be removed in like manner.

The second and equally important feature of my process is that of passing from one use to another, or from the other to the one, of liquids nonmiscible in character. Let it be supposed that a membrane has been used to filter a fluid containing water, and it is desired to use the same membrane to filter a coaltar derivative. It is first subjected to an alcohol or a ketone, or a derivative or homologue of either, by which the water content is displaced by the medium, and the medium being miscible with the coaltar fluid, the coaltar fluid is then put into the filter where it first mixes with the contained medium and presently supplants the same, and the filtration proceeds.

It is evident that if the conditions were reversed—that is to say, if the membrane had been used with a coaltar fluid and it were desired to use the same with an aqueous fluid—the process would be the same.

It is wholly inexpedient to attempt to recite all of the fluids and mediums nonmiscible and miscible, and it is to be understood that my invention includes broadly the discovery of employing a medium or mediums commonly miscible with two nonmiscible fluids to pass from one fluid to the other.

Having thus described my invention or discovery and its method of application, I claim:—

1. The process of preparing membranes for filtering uses consisting of supplanting the water contained in such membrane by a medium miscible both with water and the fluid to be filtered.

2. The process of changing over a membrane from a capacity for filtering one fluid to like capacity for another fluid nonmiscible with the first fluid, consisting of supplanting the contained first fluid in said membrane by a medium miscible with both fluids, and then supplanting the contained medium by the fluid to be filtered.

3. The process of changing over a filter suitable for filtering colloids from a capacity for one fluid to a capacity for a fluid nonmiscible with the first, consisting of putting through the filter a medium miscible with the previously used fluid and the fluid to be filtered, removing the discharge of fluid and medium, and following with the fluid to be filtered.

4. The process of changing over a membrane from filtration use with one fluid to another nonmiscible fluid, consisting of successive displacement of fluid and medium in said membrane by miscible media until the membrane-content is miscible with the fluid to be filtered.

In testimony whereof, I hereby affix my signature in presence of two witnesses.

JUSTIN F. WAIT.

Witnesses:
JNO. DEVLIN,
HARRY G. TUCKER.